Aug. 9, 1960   J. C. VAN VESSEM ET AL   2,948,050
METHOD OF MANUFACTURING ELECTRODE SYSTEMS COMPRISING
SEMI-CONDUCTIVE BODIES, MORE PARTICULARLY
CRYSTAL DIODES OR TRANSISTORS
Filed Dec. 29, 1954
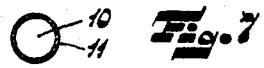
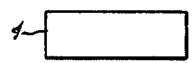
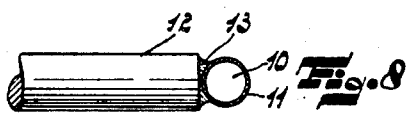
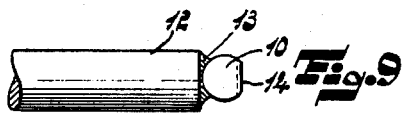
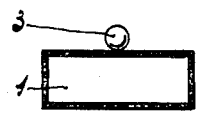
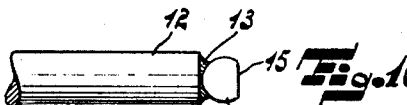
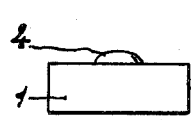
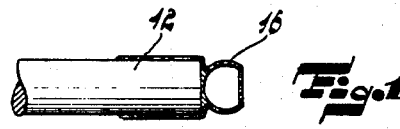
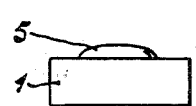
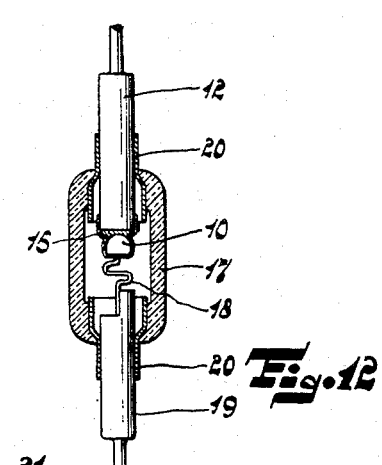
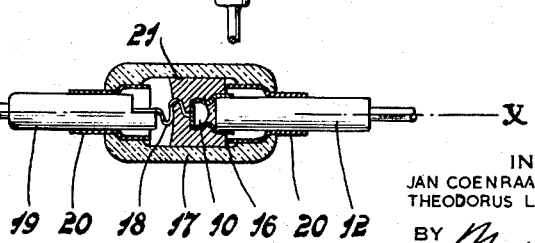
INVENTORS
JAN COENRAAD VAN VESSEM
THEODORUS LE GRAND
BY 
AGENT United States Patent Office 2,948,050
Patented Aug. 9, 1960

2,948,050
METHOD OF MANUFACTURING ELECTRODE SYSTEMS COMPRISING SEMI-CONDUCTIVE BODIES, MORE PARTICULARLY CRYSTAL DIODES OR TRANSISTORS

Jan Coenraad Van Vessem and Theodorus Le Grand, Eindhoven, Netherlands, assignors, by mesne assignments, to North American Philips Company, Inc., New York, N.Y., a corporation of Delaware Filed Dec. 29, 1954, Ser. No. 478,424

Claims priority, application Netherlands Apr. 20, 1954

3 Claims. (Cl. 29—25.3)

This invention relates to methods of manufacturing electrode systems comprising semi-conductive bodies, more particularly crystal diodes or transistors, in which part of the surface of the semi-conductive body is cleaned, for example by grinding and/or etching. It is common practice to submit the semi-conductive bodies which may consist of, for example, germanium or silicon, to such a cleaning process before assembling the systems further, for example providing them with other electrodes and arranging them in an envelope.

However, the electrical properties of the completed systems may exhibit comparatively great differences and this is naturally undesirable. The invention is based on recognition of the fact that the differences are largely attributable to atmospheric influences exerted upon the semi-conductive body during the time which elapses between cleaning and further assembling consisting in the arrangement of further electrodes and the incorporation in an envelope.

The object of the invention is inter alia to avoid the said disadvantage and to facilitate the manufacture of a uniform product.

According to the invention, the cleaned surface of the semi-conductive body is covered, immediately after cleaning, with a dense insulating layer which is removed, if necessary, in the further assembling of the systems. The influence exerted upon the said surface by the atmosphere is thus substantially eliminated.

The dense layer may consist of a material which disappears during the further assembling of the systems, preferably as a result of an increase in temperature occurring during the assembling operation. The layer may, for example, evaporate or combust.

If the electrode systems are of the kind in which at least one fused electrode is provided on the semi-conductive body, the layer is preferably manufactured from a material which disappears below the melting temperature.

If the electrode system is of the kind in which one or more whiskers (point-contact electrodes) bear on the semi-conductive body, the whiskers are preferably pushed through the dense layer.

Suitable materials for manufacturing the layer are cellulose esters, polystyrene, alkyd resins, polyisobutylene and many other materials.

In this embodiment it may be advantageous for the dense insulating layer, which is not subject to deformation, to be covered with a viscous layer to prevent any contamination of the semi-conductive body, since contamination could still occur at the area, at which a whisker is pushed through the solid layer, more particularly since such whiskers are heated to a high temperature during the so-called forming process. The viscous layer may be caused to adhere rigidly to the solid insulating layer by centrifuging. It is preferably much thicker than the solid layer.

In order that the invention may be readily carried into effect, it will now be described with reference to the accompanying drawings showing, by way of example, two embodiments thereof.

Figs. 1 to 6 show diagrammatically the different stages of the manufacture of a transistor with electrodes melted thereon, a so-called alloy transistor.

Figs. 7 to 12 are analogous views of the manufacture of a diode having a whisker (point-contact electrode).

Fig. 13 is a cross-sectional view of another embodiment of a diode.

The initial product for the transistor is constituted by a small block of semi-conductive material 1, for example germanium, which has been sawn from a monocrystal. The block is etched in the usual manner, so that a thin layer indicated by dotted lines in Fig. 1 disappears and a slightly smaller block remains (Fig. 2). Immediately after etching, the block is covered with a dense layer 2, which consists, for example, of nitrocellulose (Fig. 3). The block may thus be stored for a long period without being subject to the harmful influence of the atmosphere.

Afterwards, electrodes may be provided on the block by melting. They may consist, for example, of indium if the semi-conductor is of germanium of the n-conductivity type, or of a lead-antimony alloy, if the germanium is of the p-conductivity type.

Such a metal is provided on the block in the form of a small ball 3 (Fig. 4) and the whole is heated, with the result that the layer 2 disappears and the small ball 3 fuses and alloys with the germanium to form an electrode 4 (Fig. 5).

Subsequently, the block is placed upside down and a second electrode 5 is melted on the other side (Fig. 6). The transistor may be provided with current supply wires and incorporated in an envelope in the usual manner.

The initial product for the diode is constituted by a grain of germanium 10, which is covered galvanically with a thin layer of copper 11 (Fig. 7). This grain is secured to the head of a carrier 12 with the use of a soldering agent 13, for example tin (Fig. 8). Subsequently, a plane surface 14 is ground on the side of the grain which is remote from the carrier (Fig. 9). The copper layer is not shown in this and following figures. Subsequently, the assembly is etched, as before, in the usual manner, resulting in a cleaned surface 15 (Fig. 10). The extremity of the carrier is then covered with a dense layer 16, for example by either dipping the carrier or spraying it with a solution of polystyrene in benzene (Fig. 11). The resultant electrode with carrier is now protected against atmospheric influences.

Finally, the carrier 12, together with the semi-conductive body 10, is incorporated in an envelope 17 which is, for example, of glass. A second electrode in the form of a whisker 18, which is secured to a carrier 19, may without objection be pushed through the layer 16. The two carriers are in this case soldered in metallic tubes 20 sealed in the glass. In this case the use of the dense layer 16 affords the particular advantage that the semi-conductive body is also protected against the action of vapour which may be developed from the fusion agent used in soldering.

Fig. 13 shows a similar diode in which the dense and solid layer 16 is covered with a viscous layer or fill 21. The layer 21 may consist, for example, of so-called silicone grease, a mass consisting of polymethyl siloxanes, which is commercially sold under the mark "Dow Corning DC 4, 7 or 25." The layer 21, after having introduced the system into the envelope, is preferably caused to rigidly adhere by centrifuging about an axis Y—Y which is at right angles to the longitudinal axis X—X of the diode.

It is observed that it is known to cover a carrier together with a semi-conductive body secured thereto with an insulating layer. However, such a layer was provided before grinding or cleaning the body, so that in this case the insulating layer did not exert a protecting influence upon the cleaned surface. It is also known for the whiskers of diodes or transistors, after being placed on the semi-conductive body, to be embedded in an insulating mass either for better securing thereof or for eliminating atmospheric influences. The harmful influence of the atmosphere during the time which elapses between the cleaning of the semi-conductive surface and the further assembling is in this case not eliminated either.

What is claimed is:

1. A method of manufacturing a semi-conductor device containing a point electrode in contact with a semi-conductive body, which comprises subjecting at least a portion of the surface of said body to a treatment including etching wherein said surface portion is cleaned and polished and thereby becomes subject to contamination from various elements present in the atmosphere and the like, immediately thereafter covering said surface with a layer of dense, substantially atmospheric-proof, insulating material to thereby prevent said contaminating elements from contacting said cleaned surface portion, thereafter mounting said point electrode in contact with the semi-conductive body by urging said point electrode through the insulating layer into contact with said cleaned surface, thereafter surrounding the insulating layer with a viscous fill to prevent said contaminating elements from contacting the cleaned surface through the aperture in the insulating layer formed by the point electrode, and thereafter centrifuging the device to cause rigid adherence between the viscous fill and the insulating layer.

2. A method of making a semi-conductor device comprising a semi-conductive body, an electrode coupled to said body, and an envelope enclosing the body and electrode, comprising introducing into said envelope a viscous, insulating fill in a quantity sufficient to embrace the body and electrode and engage the surrounding envelope walls and fill the intervening space closing the envelope, and thereafter centrifuging the device in a direction causing the viscous fill rigidly to adhere to the body and envelope walls and thus provide a dense fill affording protection of the body.

3. A method as set forth in claim 2 wherein the device is elongated and has a longitudinal axis, and the device is centrifuged about an axis extending at right angles to the said longitudinal axis.

References Cited in the file of this patent

UNITED STATES PATENTS

| | | |
|---|---|---|
| 1,581,401 | Mueller | Apr. 20, 1926 |
| 1,851,509 | Hampton | Mar. 29, 1932 |
| 2,312,710 | Gordon | Mar. 2, 1943 |
| 2,406,405 | Salisbury | Aug. 27, 1946 |
| 2,419,561 | Jones et al. | Apr. 29, 1947 |
| 2,442,179 | Shanklin | May 25, 1948 |
| 2,741,686 | North et al. | Apr. 10, 1956 |
| 2,748,326 | Ingraham | May 29, 1956 |
| 2,751,529 | Stineman et al. | June 19, 1956 |
| 2,829,422 | Fuller | Apr. 8, 1958 |
| 2,857,560 | Schnable | Oct. 21, 1958 |

UNITED STATES PATENT OFFICE

CERTIFICATE OF CORRECTION

Patent No. 2,948,050            August 9, 1960

Jan Coenraad Van Vessem et al.

It is hereby certified that error appears in the printed specification of the above numbered patent requiring correction and that the said Letters Patent should read as corrected below.

Column 1, line 35, for the indistinct word, read -- in --; column 4, line 9, after "space" insert a comma.

Signed and sealed this 11th day of April 1961.

(SEAL)
Attest:
ERNEST W. SWIDER
Attesting Officer

ARTHUR W. CROCKER
Acting Commissioner of Patents